Patented June 15, 1948

2,443,226

UNITED STATES PATENT OFFICE 2,443,226

METALLIZED PYRAZOLONE AZO DYES

Boyce Galloway Carson, Woodstown, N. J., assignor to E. I. du Pont de Nemours & Company, Wilmington, Del., a corporation of Delaware No Drawing. Application June 30, 1943, Serial No. 492,894

6 Claims. (Cl. 260—147)

This invention relates to new metallized dyestuffs suitable for the dyeing of wool, silk and nylon.

It is shown in the prior art to prepare dyestuffs by coupling ortho-amino-phenol-para-sulfonic acids to various coupling components for the preparation of metallizable dyes. These dyestuffs have some excellent properties but are deficient in others. For example, the dye prepared by coupling the diazo of 2-amino-phenol-4-sulfonic acid to phenyl-methyl-pyrazolone has insufficient wet-fastness, which shows up particularly in fulling. For another example, the chromium complex of the dye prepared from diazotized 6-chloro-2-amino-phenol-4-sulfonic acid coupled to phenyl-methyl-pyrazolone will not dye evenly.

It is an object of this invention to prepare dyestuffs which are level dyeing and fast to light, to fulling and to washing.

The objects of the invention are accomplished, generally speaking, by coupling the diazo of 3,6-dichloro-2-amino-phenol-4-sulfonic acid to a pyrazolone free from sulfonic acid and sulfonamide groups. The new colors may be metallized before or after application to the fiber and in either case present qualities superior to the similar dyestuffs of the prior art.

In metallizing the dyestuffs standard practice may be followed, using trivalent chromium, copper, nickel, cobalt and iron in the form of their fluorides, acetates, formates or sulfates for the metallization. Of the metals chromium, copper, cobalt, nickel, and iron, chromium is the preferred metal to bring into complex formation with the dye for use on wool and silk. For nylon the copper complex, a brownish orange, has better fastness properties. The shade of the dye on nylon varies considerably with the metal salt used in the forming of the complex, whether the complex is formed in substance or on the fiber. The cobalt complex on nylon is a red yellow; the nickel complex is noticeably redder; and the ferrous complex is dull red yellow. These complexes may be formed in the usual way by refluxing the parent dye with water-soluble salts, such as the acetate, the sulfate, the formate, or the fluoride of copper, cobalt, nickel, or iron. Dyeings very similar to those obtained by applying the premetallized dyes to wool, silk, or nylon may be obtained by incorporating the water-soluble metallic salts together with the unmetallized dye in the dyebath as is common in the chromate process.

In addition to the pyrazolones listed in the examples in extenso, the following are illustrative of those which are satisfactory: 1-phenyl-5-pyrazolone-3,3'-dicarboxylic acid, 1-phenyl-5-pyrazolone-3-ethyl (or methyl) carboxylic ester, 1-(4'-chloro-phenyl) - 3 - methyl-5-pyrazolone, 1-(4'-methyl - phenyl) -3 - methyl-5-pyrazolone, 1-(2',5'-dimethoxy-phenyl)- 3 - methyl - 5 - pyrazolone, 1-(4'-nitro - phenyl) -5-pyrazolone-3-carboxylic - amide, 1-(3'-nitro - phenyl) - 5 - pyrazolone-3-carboxylic - amide, and 1-phenyl-5-pyrazolonyl-3-acetic acid.

The diazo oxide of the diazo component may be obtained directly by the diazotization of dichloro - amino - phenol - sulfonic acid, but the method indicated in Example I is preferred, because of the ease of obtaining 2,4,5-trichlorometanilic acid compared with the difficulty of obtaining 3,6-dichloro-2-amino - phenol-4-sulfonic acid as a crystalline solid. The coupling can be carried out on either the acid or alkaline side.

The following examples illustrate the invention but in no way limit its scope. The quantities mentioned are parts by weight unless otherwise indicated.

Example I 27.65 parts of 2,4,5-trichloro-metanilic acid is slurried in 275 parts of water while the temperature of the slurry is raised until all the solid material dissolves. The solution is cooled to 25–30° C. by the addition of ice and then 6.9 parts of sodium nitrite is added as a 30% solution. To this solution is added as rapidly as possible 7.3 parts of hydrochloric acid as a 35% solution. Diazotization is rapid, and almost immediately the insoluble diazo compound separates out as golden flakes. To the slurry of precipitated diazo compound is added 68.0 parts of crystalline sodium acetate and the whole is stirred till the solid material goes into solution and the diazo compound no longer couples with an alkaline solution of G-salt. The solution of diazo oxide thus formed is added slowly to a cold solution of 18.7 parts of 1-phenyl-3-methyl-5-pyrazolone, 4.4 parts of caustic soda, 10.6 parts of calcined soda ash and 300 parts of water. Coupling is rapid.

When the coupling is complete, the dye is separated in the usual manner by the addition of common salt. In the form of its free acid it has the structure:

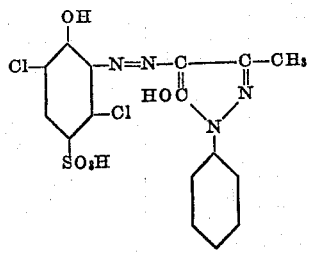

This dye when applied to wool by the chromate or the after-chrome method dyes the wool an even shade of yellow-orange. The dyeings have good fastness to light, washing, and fulling. It is also applied with good results to silk and nylon. On nylon the color is red orange.

For chroming the dye in substance, the wet press cake from the above coupling is added to a suspension of chromium fluoride equivalent to 8.4 parts of chromium oxide in 500 parts of water. The whole is refluxed from 20 to 25 hours until the formation of the complex is complete. The chromium complex of the dye is separated in the usual manner by the addition of common salt. It is a yellow-brown powder which is used to dye wool, silk, or nylon from a bath containing sulfuric acid and Glauber's salt. This chromiferous dye is much superior in light fastness to the chromiferous yellow-oranges heretofore known. The dyeings are similar in light fastness to the dyeings made with the chromiferous dye made by chroming the coupling product from the diazo of 6-chloro-2-amino-phenol-4-sulfonic acid coupled with 1-phenyl-3-methyl-5-pyrazolone but the latter chromiferous dye is utterly devoid of even dyeing properties.

*Example II*

27.65 parts of 2,4,5-trichloro-metanilic acid is diazotized and converted to the diazo oxide of 3,6-dichloro-2-amino-phenol-4-sulfonic acid as in Example I. The solution of the diazo oxide thus formed is run slowly into a solution consisting of 22.8 parts of 1-(3'-nitro-phenyl)-5-pyrazolone-3-carboxylic acid, 21.2 parts of sodium carbonate and 500 parts of water. Coupling is rapid. When it is complete, the dye is separated by the addition of common salt. This dye in the form of its free acid has the structure:

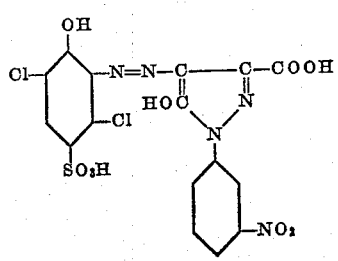

It may be applied to wool, silk, or nylon by the chromate or after-chrome method. Its unchromed shade on wool is yellow, which changes to a yellow red on chroming. The fastness to light and wet treatments of the chromed dyeing is good.

The dye from the above coupling may be converted into its chromium complex by the method used in Example I. Instead of chromium fluoride other agents yielding chromium may be used. The chroming may be carried out in the presence or absence of such compounds as poly-hydroxy alcohols, amines, cyclic nitrogen compounds, and the like. The chromium complex of the above-mentioned dye dyes wool, silk, or nylon from a bath containing sulfuric acid a red with good fastness properties.

Similarly, red dyes of good fastness properties may be prepared by substituting for the 1-(3'-nitro-phenyl)-5-pyrazolone-3-carboxylic acid such pyrazolones as 1-(4'-nitro-phenyl)-5-pyrazolone-3-carboxylic acid and 1-phenyl-5-pyrazolone-3-carboxylic acid.

A general formula for the dyes of my invention is this:

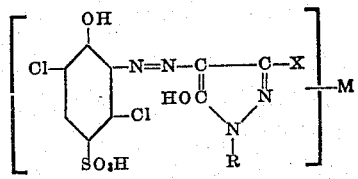

wherein R represents a member of the group consisting of hydrogen, alkyl, aralkyl and aryl free from $SO_3H$ and $SO_2NH_2$; X represents a member of the group consisting of COOH, COO-alkyl, alkyl, —$CH_2COOH$, —$CH_2COO$-alkyl, and $CONH_2$; and M is from the group consisting of chromium, copper, nickel, cobalt, and iron. To alter the group R of the formula has little effect on the shade of the dye; it may be H, phenyl, naphthyl, or diphenyl, and the aromatic nuclei may contain other substituent groups such as $NO_2$, Cl, Br, $OCH_3$, and $CH_3$ without appreciably affecting the shade. The character of substituent X appears to have little effect on the fastness properties but considerable effect on the shade of the dye: For instance, X may be $CH_3$ or $CH_2COOCH_3$, or it may be either COOH or $COOC_2H_5$ without material change in fastness, but the use of COOH or $COOC_2H_5$ gives redder dyes than $CH_3$ or $CH_2COOCH_3$. When X is $CONH_2$ the dyes produced become still redder.

This invention makes possible the preparation of yellow orange prechromed dyes of light fastness superior to those yellow-orange chromiferous dyes heretofore known. It also makes possible the preparation of new and valuable pyrazolone chromable dyes of yellow-orange and red-orange shades capable of being dyed both by the after-chrome and by the chromate processes.

As many apparently widely different embodiments of this invention may be made without departing from the spirit and scope thereof, it is to be understood that I do not limit myself to the specific embodiments thereof except as defined in the appended claims.

I claim:
1. A metallized monazo dye represented by the formula

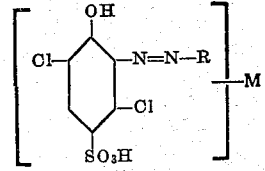

wherein R is a 1-aryl-5-pyrazolone-3-substituted azo dye coupling component wherein aryl is a radical of the benzene series having one carbocyclic ring which is devoid of sulfonic and sulfonamide groups, the 3-substituted group being one of a group consisting of —CH₃, —COO-alkyl wherein alkyl is lower alkyl, —COOH,

—CH₂COOH and —CONH₂; and M represents one of a group consisting of chromium, copper, nickel, cobalt and iron.

2. A dye represented by the formula,

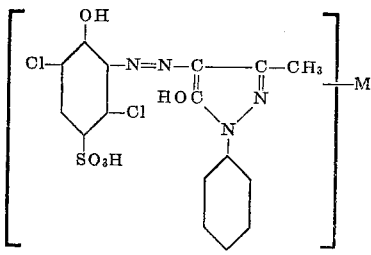

wherein M represents one of a group consisting of chromium, copper, nickel, cobalt, and iron.

3. The dye represented by the formula of claim 2 in which the metal is chromium.

4. The process which comprises coupling the diazo of 3,6-dichloro-2-amino-phenol-4-sulfonic acid with a 1-aryl-5-pyrazolone in which the 3-position is substituted by one of a group consisting of methyl, —COO-alkyl wherein alkyl is lower alkyl, —COOH, —CH₂COOH and —CONH₂, and wherein aryl is a radical of the benzene series having one carbocyclic ring which is devoid of sulfonic and sulfonamide groups, and metallizing the color with one of a group consisting of trivalent chromium, copper, nickel, cobalt, and iron in the form of the fluoride, acetate, formate, or sulfate.

5. The process which comprises coupling the diazo of 3,6-dichloro-2-amino-phenol-4-sulfonic acid with a 1-aryl-3-methyl-5-pyrazolone wherein aryl is a radical of the benzene series having one carbocyclic ring which is free from sulfonic acid and sulfonamide groups and metallizing the dyestuff with a metal from the group consisting of chromium, copper, cobalt, iron, and nickel.

6. The process of claim 5 in which the metal is chromium.

BOYCE GALLOWAY CARSON.

REFERENCES CITED

The following references are of record in the file of this patent:

UNITED STATES PATENTS

| Number | Name | Date |
|---|---|---|
| 1,809,030 | Geller | June 9, 1931 |
| 1,949,228 | Winkeler et al. | Feb. 27, 1934 |
| 2,040,368 | Fischer | May 12, 1936 |
| 2,289,210 | Reynolds et al. | July 7, 1942 |

OTHER REFERENCES

W. B. Reynolds, American Dyestuff Reporter, vol. 32, Oct. 25, 1943, page 456. (Copy in Sci. Lib.)